United States Patent Office 2,781,240
Patented Feb. 12, 1957

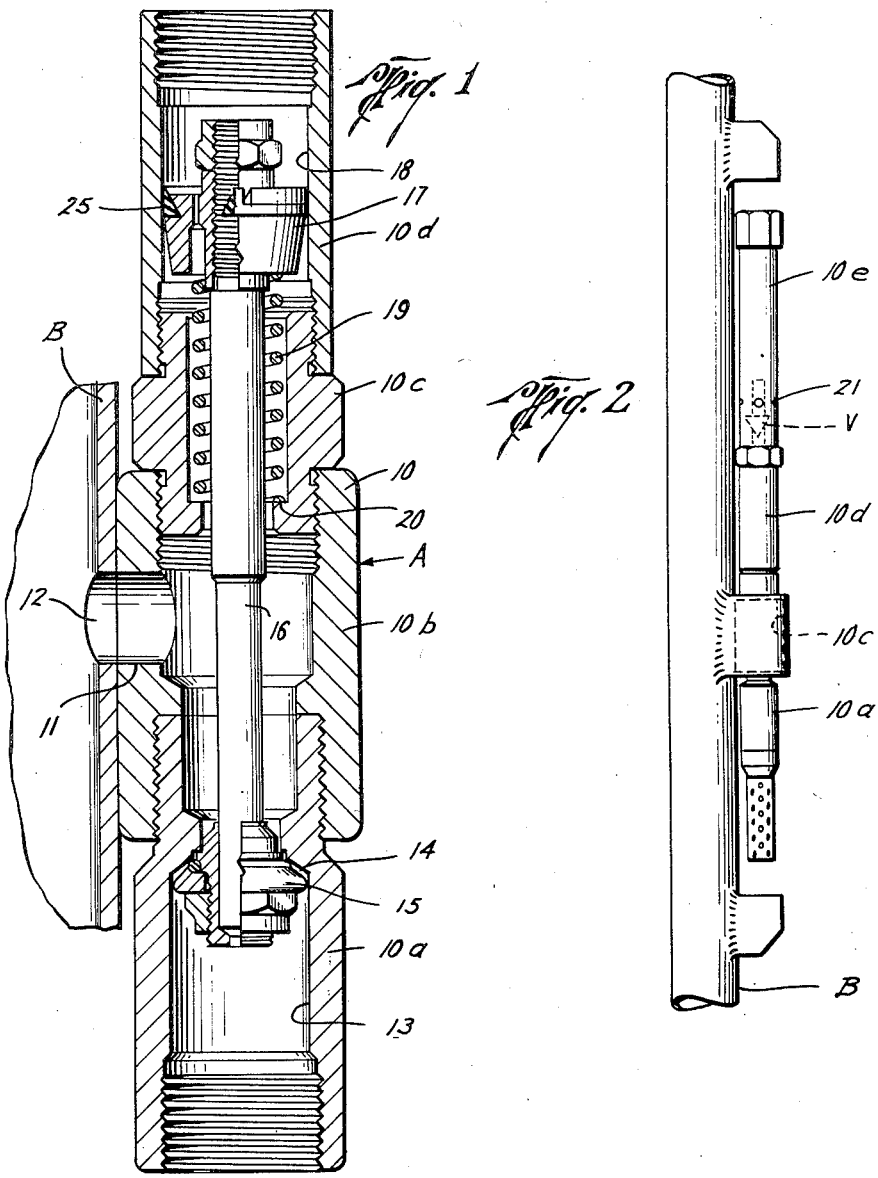

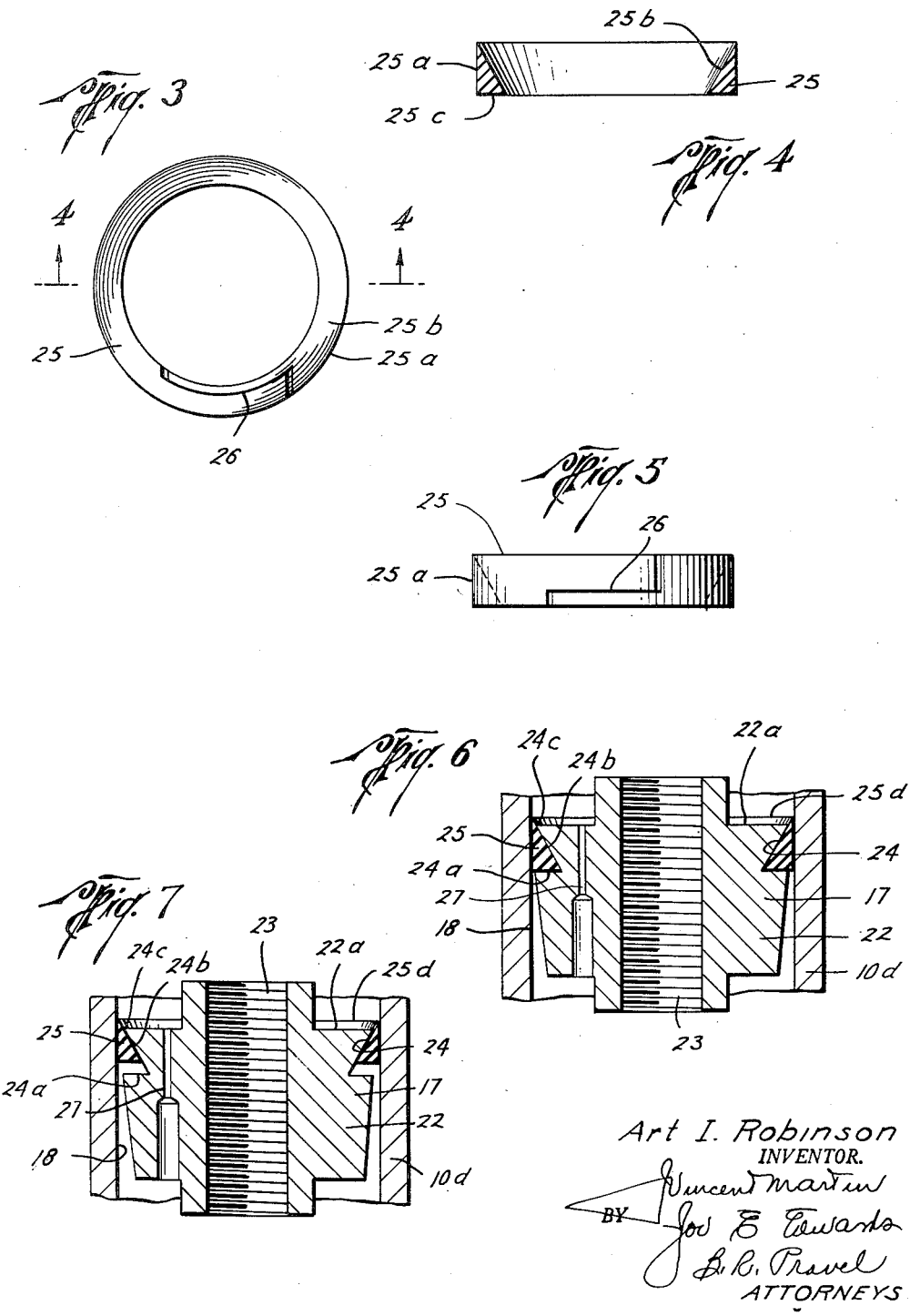

2,781,240

PISTON ASSEMBLIES

Art I. Robinson, Dallas, Tex., assignor to Merla Tool Corporation, Dallas, Tex., a corporation of Texas Application March 19, 1954, Serial No. 417,285

3 Claims. (Cl. 309—23)

This invention relates to new and useful improvements in piston assemblies.

The invention relates particularly to piston assemblies which are adapted for use in conjunction with valve elements such as are employed in gas lift apparatus for controlling the entry of a lifting gas into well fluid columns.

One object of the invention is to provide an improved piston assembly wherein a metallic piston member which is movable within a cylinder has mounted thereon a sealing ring constructed of a deformable material having a low coefficient of friction, said ring functioning to maintain the required seal between the piston and cylinder wall, whereby the usual disadvantages caused by a metal piston or piston ring moving within a metallic cylinder are obviated.

An important object of the invention is to provide a piston assembly including a metallic piston having a sealing ring of deformable material mounted thereon in an improved manner so that wear is automatically compensated for, the piston is self-cleaning, minimum friction between cylinder and piston is had and effective sealing throughout the life of the assembly is assured.

Another object is to provide a piston assembly of the character described, wherein a sealing ring constructed of a deformable material having a low coefficient of friction, such as "Teflon," is mounted on the piston and is movable within a cylinder having its wall of a hard, smooth surface such as chrome plating, whereby extraneous matter such as sand which may find its way between the ring and cylinder wall will not cause sticking of the piston within the cylinder so that efficient operation of the piston even under adverse fluid conditions is not interfered with.

A further object is to provide an assembly of the character described, including a piston having a sealing ring groove of a shape which is generally triangular in cross-section, together with a sealing ring also of generally triangular shape in cross-section mounted in the groove; said ring having a step-cut expansion joint whereby the co-action between the ring and the wall of the groove maintains the ring in sealing contact with the cylinder wall.

Still another object is to dispose the sealing ring, which is of a deformable material having a low coefficient of friction and which is generally triangular in cross-section, in such position that its relatively thin edge is directed toward the high pressure side of the piston; any pressure differential across said ring causing it to expand into tight sealing engagement with the cylinder wall to assure an effective seal of pressure attempting to by-pass the piston.

A particular object is to provide a piston assembly which, although forming an effective seal, also permits relatively loose fits and wide tolerances in the various parts of the assembly whereby manufacturing is simplified and costs thereby reduced.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a view, partly in section and partly in elevation showing a piston assembly, constructed in accordance with the invention, mounted within a flow valve device, Figure 2 is an elevation of the exterior of the flow valve device illustrating the same connected in a well conductor, Figure 3 is a plan view of the piston sealing ring of the assembly, Figure 4 is a sectional view, taken on the line 4—4 of Figure 3, Figure 5 is a side elevation of the sealing ring, Figure 6 is a transverse sectional view, illustrating the sealing ring thereon and showing the same within a cylinder, and Figure 7 is a similar view showing the movement of the sealing ring relative to its groove which compensates for wear.

This invention will be described as employed with a flow valve which controls the admission of a lifting fluid such as gas into a well conductor. However, it is to be understood that the piston assembly constituting the present invention may be used for other purposes and its application in a flow valve device is merely for the purposes of illustration.

In the drawings the letter A designates a flow valve device which includes an outer housing 10 which is made up of sections 10a, 10b, 10c, and 10d. The section 10b comprises the main or central portion of the housing and is adapted to be suitably secured to the exterior wall of a well conductor B. A radial port 11 extends through the wall of the section 10b and is in communication with a port 12 formed in the wall of the conductor. The lower section 10a which is threaded into the section 10b has its bore 13 in communication with the bore of the section 10b and provides an inlet passage. An annular valve seat 14 is located in the upper portion of the bore 13 and is adapted to be engaged by a valve member 15. It is evident that the flow valve device A is located in the annulus outside of the well conductor B and when this annulus is filled with a lifting gas under pressure, said gas may enter the passage or bore 13 of the lower section 10a. When the valve 15 is unseated the lifting gas may flow through the housing section 10b and then through ports 11 and 12 to the interior of the well conductor, whereby the liquid in such conductor will be lifted by said gas.

The valve 15 is formed with an axial valve stem 16 which extends upwardly through the housing 10 and into the upper section 10b of said housing. A piston 17 constructed in accordance with the present invention is mounted within the bore 18 of the section 10b. A coil spring 19 which surrounds the stem 16 and which is disposed between a shoulder 20 within section 10c and the under side of the piston 17 functions to constantly urge the piston, valve stem and valve in an upward direction, whereby the spring exerts its force to maintain the valve 15 in a seated position.

A pilot valve section 10e is secured to the upper end of the cylinder section 10b and includes a pilot valve V which controls the application of pressure to the upper surface of the piston 17. The pilot valve section forms no part of the present invention but includes any valve which will be actuated when the pressure in the annulus outside of the well conductor B reaches a predetermined point. Such pressure is admitted into the pilot valve section through radial inlets openings 21.

Briefly, in the operation of the flow valve device the parts are in the position shown in Figure 1. At this time, the pilot valve V is closed and no pressure is acting against the upper end of the piston 17. The coil spring 19 functions to maintain the valve 15 in its seated position. When lifting fluid is admitted into the annulus such lifting fluid will of course enter the passage 13 and will act against the lower end of the valve to assist the spring 19 in holding said valve closed. When the pressure of the lifting fluid in the annulus builds up to a point sufficient to open the pilot valve V, said valve is opened to admit pressure against the upper end of the piston 17. The cross-sectional area of the piston is sufficiently greater than the cross-sectional area of the valve element 15 so that the gas pressure admitted into the bore 18 of the cylinder section 10b acting against such piston is sufficient to move such piston downwardly within the bore to open the valve 15. When the valve is opened, lifting gas pressure is admitted into the conductor B to lift the well liquid therein.

In valves of this character it has been the previous practice to employ a power bellows in place of the piston 17 but such bellows have certain design limits; also the corrosive action of well fluids on the relatively thin metal walls of the bellows contributed to failure. The present invention contemplates the piston assembly which includes the piston 17, together with the piston ring which will be hereinafter described in detail.

Referring to Figures 3 to 7, the piston 17 includes a body portion 22 having an axial threaded bore 23 which facilitates the connection of a piston rod or valve stem therein. The external wall of the piston is tapered inwardly from its upper to its lower end, as is clearly shown in Figures 6 and 7; this means that the lower portion of the piston has a full clearance with respect to the wall of the bore 18 of the cylinder within which the piston is movable. At its upper portion the piston is formed with an external annular groove 24 and the particular cross-sectional shape of this groove is of importance. As is clearly shown in Figures 6 and 7, the base 24a of the groove lies in substantially a horizontal plane, while the rear or inner wall 24b of said groove is inclined with respect to the axis of the piston. As shown, the wall 24b extends from the inner extremity of wall 24a to a point 24c on the exterior of the piston. As illustrated, the upper end or point 24c of the groove lies in the same plane as the upper surface 22a of the piston. This shape of the groove causes said groove to be substantially of general triangular shape in cross-section.

The piston body 17 is constructed of any suitable metal and the groove 24 is adapted to receive a split sealing ring 25. This ring is constructed of a deformable material which is somewhat resilient or flexible and which has an extremely low coefficient of friction. It has been found that tetrafluoroethylene resin, generally known under the trade name "Teflon," is a satisfactory material. The construction of the ring is fully shown in Figures 3 to 5 and said ring is generally triangular in cross-section. Its outer periphery 25a provides a substantially straight wall, that is a wall which is parallel to the axis of the piston when the ring is in position within the groove 24. The inner periphery of the ring designated at 25b is inclined complementary to the inclined wall 24b of the groove. The bottom 25c of the groove is substantially flat and conforms to the flat base wall 24a of the groove. The height of the ring 25 is greater than that of the groove, so that when the ring is disposed within the groove, as shown in Figure 6, the upper end of the ring indicated at 25d is in a plane above the upper surface 22a of the piston. The ring is split and is provided with a step joint 26, which permits radial expansion and contraction of the ring without permitting a leakage at said ring. It is noted that when the ring is in position within the groove 24 (Figure 6) the apex of the triangular shaped ring is directed upwardly toward the pressure side of the cylinder within which the piston is movable.

In the operation of the piston, when pressure is applied to the end 22a of said piston, said pressure will move the piston within the cylinder. The pressure, being applied to the end 22a of the piston, will tend to force the piston downwardly with respect to the "Teflon" sealing ring 25 and the co-action between the inclined surfaces 24b and 25b will urge the external peripheral surface 25a of the ring into tight sealing engagement with the cylinder wall 18. This position of the parts is shown in an exaggerated manner in Figure 7 and thus so long as pressure is being applied to the piston a tight sealing contact between the ring 25 and the cylinder wall will be assured. The wall 18 of the cylinder bore is preferably of a hard smooth material and actually it has been found that chrome plating provides an excellent cylinder bore surface. When pressure is relieved against the end of the piston and the spring 19 returns said piston toward its upward position, the co-action between the inclined surfaces 24b and 25b will permit an easy movement of the piston within its cylinder. It is noted that since the ring is constructed of "Teflon" or similar material having a low coefficient of friction, there is very little resistance to movement of the piston within the cylinder bore even when pressure is being applied against the upper end 22a of said piston. The step joint 26 in the sealing ring permits free expansion and contraction of the ring to change its external diameter as the piston is reciprocated within its cylinder.

The structure shown and described has many advantages. It has been found that said piston will not be stuck or its operation otherwise interfered with in the presence and sand or other small particles. If there is any sand within the cylinder bore, the grains may be forced between the piston ring 25 and the wall 18. However, since the ring is of a relatively soft plastic and can be easily indented, while the cylinder wall is of a hard material, any sand grains entering therebetween will merely become embedded within the surface of the ring. Although the ring provides an efficient sealing against pressure it does not have sufficient strength to force the sand grains against the cylinder wall with sufficient force to score or mark the same, and the embedded sand particle merely slides back and forth over the hard surface and forces itself deeper into the "Teflon" ring until it exerts practically no force against the cylinder wall.

The ring 25 is of a material having a very low coefficient of friction and therefore has no appreciable wear. The material is also chemically inert to all substances which it may come into contact with and therefore the life of the assembly will be substantially coextensive to the life of the complete valve. The triangular cross-section shape of the ring and its receiving groove, together with the step joint of the ring, assures positive sealing pressure. With the thin or apex end of the ring exposed toward the high pressure side of the piston, the pressure functions to maintain the ring in tight sealing engagement with the cylinder bore. This design also permits the maintenance of an effective seal even though the ring 25 may wear to a thinner cross-section and the cylinder bore may wear to a larger diameter. As wear occurs, the ring merely rides higher up on the triangular shaped groove and still maintains an efficient seal with the wall. It is also noted that the relatively thin apex end of the groove more or less scrapes the wall of the cylinder bore during its reciprocation and scrapes any extraneous matter from said wall. This matter would be deposited upon the upper end 22a of the piston and may bypass said piston through a small bleed port 27 which is provided for this purpose. The piston is thus more or less self cleaning in operation.

It is evident that in operation the ring 25 will expand out to the cylinder wall during the pressure stroke to effect the seal and therefore it is possible to provide for a clearance between the piston body 22 and the cylinder wall. As a result, friction is minimized and a smoother operation is produced. Furthermore, because of the construction and mounting of the ring and groove and because the "Teflon" ring can itself be deformed to some extent without losing its effectiveness, larger manufacturing tolerances for all parts of the unit are permissible; also if the piston rod or valve stem is slightly misaligned with the axis of movement, this does not affect the seal which is obtained.

As has been noted, the piston assembly comprising the present invention has been found particularly suitable for flow valve devices. However, it may be employed for other purposes and will function efficiently in any environment where a piston operable by pressure is movable within a cylinder. Although the material "Teflon" has been found satisfactory as a material for the ring 25, it is evident that so long as this ring is constructed of a material having substantially the same qualities as "Teflon," the purposes of the present invention would be accomplished.

The foregoing disclosure and description of the invention is illustrative and explanatory thereof and various changes in the size, shape and materials, as well as in the details of the illustrated construction, may be made, within the scope of the appended claims, without departing from the spirit of the invention.

What I claim is:

1. A piston assembly including, a cylinder having a bore, a piston slidable within said cylinder and having an annular groove adjacent one end thereof, said groove having one wall thereof disposed in a plane which is normal to the axis of the piston and having a second inclined wall which is disposed at an angle with respect to a plane parallel to the axis, said inclined wall extending upwardly and outwardly from the first wall to the outer surface of the piston whereby the groove is substantially triangular in cross section, and a sealing ring of substantially the same cross-sectional shape as the groove mounted in said groove and having its external periphery engageable with the wall of the bore, said ring being constructed of a deformable material.

2. In a flow valve device having a gas admitting valve member, a piston assembly for controlling operation of said valve, said assembly comprising, a cylinder, a piston movable within the cylinder and connected to said valve, said piston having a groove in its external surface, said groove having one wall thereof disposed in a plane which is normal to the axis of the piston and having a second inclined wall which is disposed at an angle with respect to a plane parallel to the axis, said inclined wall extending upwardly and outwardly from the first wall to the outer surface of the piston whereby the groove is substantially triangular in cross section a sealing ring in said groove, said ring being constructed of a deformable material, and co-acting surfaces on said ring and defining said groove for urging the ring into sealing engagement with the cylinder bore when the piston is moved by the application of pressure thereagainst.

3. A piston assembly including, a cylinder having a bore, a piston slidable within said cylinder and having an annular groove adjacent one end thereof, said groove having one wall thereof disposed in a plane which is normal to the axis of the piston and having a second inclined wall which is disposed at an angle with respect to a plane parallel to the axis, said inclined wall extending upwardly and outwardly from the first wall to the outer surface of the piston whereby the groove is substantially triangular in cross section, and a sealing ring of substantially the same cross-sectional shape as the groove mounted in said groove and having its external periphery engageable with the wall of the bore, said ring being constructed of a deformable material and having a sharp annular edge extending beyond the end of the piston so that as the piston is reciprocated in the cylinder the ring is urged into firm sealing position and so that said sharp annular edge scrapes any extraneous matter from said wall depositing same upon the outer surface of the piston.

References Cited in the file of this patent

UNITED STATES PATENTS

| | | |
|---|---|---|
| 78,911 | Adams | June 16, 1868 |
| 112,768 | Bell | Mar. 21, 1871 |
| 1,330,188 | Johnson | Feb. 10, 1920 |
| 1,381,993 | Hill et al. | June 21, 1921 |
| 1,496,536 | Heyen | June 3, 1924 |
| 1,588,705 | Cope et al. | June 15, 1926 |
| 1,737,056 | Mueller | Nov. 26, 1929 |
| 1,901,199 | Stine | Mar. 14, 1933 |
| 2,635,331 | Harbison | Apr. 21, 1953 |